(12) United States Patent
Shen (10) Patent No.: US 12,008,851 B2
(45) Date of Patent: Jun. 11, 2024

(54) METHOD FOR UNLOCKING A LOCK USING REAL-TIME WIRELESS POWER SUPPLY

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 0 days.

(21) Appl. No.: 18/345,316

(22) Filed: Jun. 30, 2023

(65) Prior Publication Data

US 2023/0343157 A1  Oct. 26, 2023

Related U.S. Application Data

(62) Division of application No. 17/350,108, filed on Jun. 17, 2021, now Pat. No. 11,756,355.

(30) Foreign Application Priority Data

Jun. 11, 2021 (TW) .................. 110121313

(51) Int. Cl.
*E05B 43/00* (2006.01)
*G07C 9/00* (2020.01)
(Continued)

(52) U.S. Cl.
CPC ........ *G07C 9/00309* (2013.01); *E05B 43/005* (2013.01); *G07C 9/25* (2020.01);
(Continued)

(58) Field of Classification Search
CPC ..... H04W 12/06; H04W 12/50; H04W 12/61; H04W 12/63; H04W 12/0471; H04W 12/47; H04W 4/02; H04W 4/50; H04W 4/80; H04W 88/02; H04W 4/025; H04W 4/029; H04W 4/12; H04W 4/021; H04L 63/0861; H04L 63/0853; H04L 63/10; H04L 67/12; H04L 67/34; H02J 50/10; H02J 50/12; H02J 7/345; G07C 2009/00373; G07C 2009/00634; G07C 2009/00777; G07C 2209/63;
(Continued)

(56) References Cited

U.S. PATENT DOCUMENTS 1,643,932 A   9/1927  Teich
1,687,009 A   10/1928 Drexler et al.
(Continued)

FOREIGN PATENT DOCUMENTS

AU   2014339759 B2   5/2018
EP   0107151 A1      5/1984
(Continued)

*Primary Examiner* — Dionne Pendleton
(74) *Attorney, Agent, or Firm* — Ying-Ting Chen (57) ABSTRACT

A method for unlocking the lock using real-time wireless power supply includes proceeding with authentication identification of a powerless lock by an electronic key after pairing. Power is wirelessly supplied from the electronic key to the lock when the authentication identification starts or the authentication identification passes. The lock obtains the power wirelessly supplied from the lock to operate. When the authentication identification is identified as being successful, the electronic key outputs an unlocking command to the lock. The lock receiving the unlocking command proceeds with an unlocking operation using the power supplied wirelessly.

10 Claims, 2 Drawing Sheets

(51) Int. Cl.
  *G07C 9/25* (2020.01)
  *H02J 50/10* (2016.01)
  *H04W 12/06* (2021.01)
  *H04W 12/50* (2021.01)

(52) U.S. Cl.
  CPC ............ *H02J 50/10* (2016.02); *H04W 12/06* (2013.01); *H04W 12/50* (2021.01); *G07C 2009/00634* (2013.01); *G07C 2009/00777* (2013.01)

(58) Field of Classification Search
  CPC ........ G07C 9/00309; G07C 9/20; G07C 9/25; G07C 9/26; G07C 9/21; G07C 2009/00769; G07C 2209/62; G07C 9/00571; G07C 9/00896; G07C 2009/00642; G07C 9/00904; G07C 9/28; G07C 9/33; G07C 2209/08; G07C 2209/64; G07C 9/00182; E05B 43/005; E05B 2047/0057; E05B 2047/0094; E05B 47/00; E05B 47/0001; E05B 65/025; E05B 2001/0076; E05B 2047/0023; E05B 2047/0061; E05B 47/0012; E05B 63/0065; E05B 63/185; H04B 5/0037; H04B 5/0012; H04B 5/0056; H04B 5/0031; H04B 5/0075; H04B 5/02; G08C 17/02; Y10T 70/7068; Y10T 70/7113; G06F 21/35; G06F 21/44; G06F 21/31; G06F 21/335; H05B 6/101; Y04S 40/20; Y04S 40/18; A47B 2029/149; A47G 29/141; G07F 17/12; G07F 17/13; G07G 1/009; E05C 7/04; E05C 7/06; E05C 9/025; E05C 9/042; B04B 1/08; B04B 5/10
  See application file for complete search history.

(56) References Cited

U.S. PATENT DOCUMENTS

| | | | |
|---|---|---|---|
| 4,102,005 A | 7/1978 | Schnarr et al. | |
| 4,348,835 A | 9/1982 | Jones et al. | |
| 4,419,787 A | 12/1983 | Lieberman | |
| 4,867,496 A | 9/1989 | Thomas | |
| 5,782,509 A | 7/1998 | Uyeda | |
| 6,177,771 B1 | 1/2001 | Kinzer et al. | |
| 6,454,324 B1 | 9/2002 | Lewis et al. | |
| 6,634,140 B1 | 10/2003 | Sellman | |
| 6,745,603 B1 | 6/2004 | Shaw | |
| 6,786,006 B2 | 9/2004 | Kowalczyk et al. | |
| 6,891,479 B1 | 5/2005 | Eccleston | |
| 7,051,403 B2 | 5/2006 | Homberg | |
| 7,061,197 B1 | 6/2006 | Mullet et al. | |
| 7,068,179 B2 | 6/2006 | Snell et al. | |
| 7,143,547 B2 | 12/2006 | Liles, Jr. | |
| 7,234,201 B2 | 6/2007 | Brown et al. | |
| 7,282,883 B2 | 10/2007 | Mullet et al. | |
| 7,296,380 B2 | 11/2007 | Backman | |
| 7,316,096 B2 | 1/2008 | Houser et al. | |
| 7,418,800 B1 | 9/2008 | Sellman | |
| 7,484,333 B2 | 2/2009 | Houser et al. | |
| 7,555,867 B2 | 7/2009 | Liles, Jr. | |
| 7,717,155 B2 | 5/2010 | Mullet | |
| 7,774,984 B2 | 8/2010 | Hsu | |
| 7,966,771 B2 | 6/2011 | Bienek | |
| 8,109,038 B2 | 2/2012 | Houser et al. | |
| 8,169,169 B2 | 5/2012 | Hass et al. | |
| 8,248,005 B2 | 8/2012 | Romer | |
| 8,359,790 B2 | 1/2013 | Shin | |
| 8,382,008 B1 | 2/2013 | Ricciardi et al. | |
| 8,390,219 B2 | 3/2013 | Houser | |
| 8,393,054 B2 | 3/2013 | Bienek | |
| 8,407,937 B2 | 4/2013 | Houser | |
| 8,415,902 B2 | 4/2013 | Burris et al. | |
| 8,434,268 B2 | 5/2013 | Nixon | |
| 8,499,495 B2 | 8/2013 | Houser et al. | |
| 8,547,046 B2 | 10/2013 | Burris et al. | |
| 8,601,744 B2 | 12/2013 | Wildforster et al. | |
| 8,695,277 B2 | 4/2014 | Romer et al. | |
| 8,826,598 B2 | 9/2014 | Ranaudo et al. | |
| 8,875,344 B2 | 11/2014 | Salutzki et al. | |
| 8,904,710 B2 | 12/2014 | Romer et al. | |
| 8,963,683 B2 | 2/2015 | Romer | |
| 9,003,630 B2 | 4/2015 | Hufen | |
| 9,045,927 B1 | 6/2015 | Hoffberg | |
| 9,097,051 B2 | 8/2015 | Hellwig | |
| 9,115,526 B2 | 8/2015 | Houser et al. | |
| 9,121,217 B1 | 9/2015 | Hoffberg | |
| 9,163,446 B2 | 10/2015 | Houser et al. | |
| 9,181,744 B2 | 11/2015 | Salutzki et al. | |
| 9,187,942 B2 | 11/2015 | Wildforster | |
| 9,297,194 B2 | 3/2016 | Bienek et al. | |
| 9,506,284 B2 | 11/2016 | Braverman et al. | |
| 9,514,583 B2 | 12/2016 | Zasowski et al. | |
| 9,631,412 B2 | 4/2017 | Hellwig et al. | |
| 9,683,378 B2 | 6/2017 | Houser et al. | |
| 9,695,620 B2 | 7/2017 | Zasowski et al. | |
| 9,830,932 B1 | 11/2017 | Gunderson et al. | |
| 9,869,117 B2 | 1/2018 | Houser et al. | |
| 9,886,831 B1 | 2/2018 | Svoboda et al. | |
| 9,995,076 B1 | 6/2018 | Hoffberg | |
| 10,006,236 B2 | 6/2018 | Hellwig et al. | |
| 10,024,094 B2 | 7/2018 | Bell et al. | |
| 10,030,425 B2 | 7/2018 | Zasowski et al. | |
| 10,030,426 B2 | 7/2018 | Langenberg | |
| 10,077,591 B2 | 9/2018 | Hass | |
| 10,180,023 B2 | 1/2019 | Zasowski et al. | |
| 10,208,520 B2 | 2/2019 | Long et al. | |
| 10,236,801 B2 | 3/2019 | Dye et al. | |
| 10,253,540 B2 | 4/2019 | Bell et al. | |
| 10,273,736 B2 | 4/2019 | Hucker | |
| 10,280,670 B2 | 5/2019 | Roberts | |
| 10,280,678 B1 | 5/2019 | Rendon, Jr. et al. | |
| 10,304,272 B2 | 5/2019 | Kvinge et al. | |
| 10,316,568 B2 | 6/2019 | Langenberg et al. | |
| 10,344,502 B2 | 7/2019 | McKibben et al. | |
| 10,415,301 B2 | 9/2019 | Kuan | |
| 10,458,151 B1 | 10/2019 | Shen | |
| 10,472,873 B2 | 11/2019 | Ladha et al. | |
| 10,559,151 B2 | 2/2020 | Kvinge et al. | |
| 10,648,208 B2 | 5/2020 | Eickhoff | |
| 10,704,310 B1 | 7/2020 | Barbon et al. | |
| 10,704,313 B2 | 7/2020 | Houser et al. | |
| 10,724,288 B2 | 7/2020 | Baumgarte | |
| 10,844,644 B2 | 11/2020 | Langenberg et al. | |
| 10,968,677 B2 | 4/2021 | Hass | |
| 11,002,055 B2 | 5/2021 | Eickhoff et al. | |
| 11,124,997 B2 | 9/2021 | Eickhoff | |
| 11,250,655 B2 | 2/2022 | Shen | |
| 11,312,207 B1* | 4/2022 | Sanders ............... G06F 3/0482 |
| 11,417,200 B2 | 8/2022 | Hass et al. | |
| 11,542,727 B2 | 1/2023 | Hsu | |
| 11,544,979 B1 | 1/2023 | Shen | |
| 11,661,782 B2 | 5/2023 | Eickhoff et al. | |
| 11,756,355 B2* | 9/2023 | Shen ................. G07C 9/00309 340/5.61 |
| 2003/0127869 A1 | 7/2003 | Herron et al. | |
| 2005/0154612 A1 | 7/2005 | Smith et al. | |
| 2006/0244271 A1 | 11/2006 | Hass | |
| 2006/0261675 A1* | 11/2006 | Unno ................. B60R 25/02153 307/10.2 |
| 2007/0256362 A1 | 11/2007 | Hansen | |
| 2010/0107495 A1 | 5/2010 | Bourgeois et al. | |
| 2010/0315229 A1 | 12/2010 | Shin | |
| 2011/0302841 A1 | 12/2011 | Ye et al. | |
| 2012/0159852 A1 | 6/2012 | Houser et al. | |
| 2012/0190325 A1 | 7/2012 | Abu-Hakima et al. | |
| 2013/0009785 A1 | 1/2013 | Finn et al. | |
| 2013/0216438 A1 | 8/2013 | Hill et al. | |
| 2013/0308778 A1 | 11/2013 | Fosmark et al. | |
| 2013/0346333 A1 | 12/2013 | Hassler et al. | |

(56) References Cited

U.S. PATENT DOCUMENTS

| | | |
|---|---|---|
| 2014/0255252 A1 | 9/2014 | Stratman et al. |
| 2014/0282934 A1 | 9/2014 | Miasnik et al. |
| 2014/0325911 A1 | 11/2014 | Hass |
| 2015/0070166 A1 | 3/2015 | Boyden et al. |
| 2015/0113876 A1 | 4/2015 | Burris et al. |
| 2015/0194033 A1 | 7/2015 | Esposito et al. |
| 2015/0211278 A1 | 7/2015 | Moyer et al. |
| 2015/0262438 A1 | 9/2015 | Zasowski et al. |
| 2015/0339913 A1 | 11/2015 | Lyman et al. |
| 2016/0220716 A1 | 8/2016 | Childress et al. |
| 2016/0312514 A1 | 10/2016 | Leonard et al. |
| 2016/0348415 A1 | 12/2016 | Baumgarte |
| 2017/0275912 A1 | 9/2017 | Murphy |
| 2017/0275921 A1 | 9/2017 | Murphy et al. |
| 2017/0328100 A1 | 11/2017 | Eickhoff |
| 2018/0334841 A1 | 11/2018 | Langenberg et al. |
| 2019/0043289 A1 | 2/2019 | Cahill |
| 2019/0043296 A1 | 2/2019 | Baumgarte et al. |
| 2019/0145138 A1 | 5/2019 | Eickhoff |
| 2019/0153764 A1 | 5/2019 | Baumgarte |
| 2019/0203503 A1 | 7/2019 | Chang |
| 2019/0264486 A1 | 8/2019 | Toloday et al. |
| 2019/0319557 A1 | 10/2019 | Dye et al. |
| 2019/0338576 A1 | 11/2019 | Wang |
| 2019/0345738 A1 | 11/2019 | McKibben et al. |
| 2019/0376316 A1 | 12/2019 | Hsu |
| 2019/0376317 A1 | 12/2019 | Hsu |
| 2019/0383080 A1 | 12/2019 | Barbon et al. |
| 2020/0037142 A1 | 1/2020 | Lofton |
| 2020/0190885 A1 | 6/2020 | Coleman |
| 2020/0256108 A1 | 8/2020 | Shetty et al. |
| 2020/0327758 A1 | 10/2020 | Ma et al. |
| 2020/0372743 A1 | 11/2020 | Miller et al. |
| 2021/0011443 A1 | 1/2021 | Mcnamara et al. |
| 2021/0012598 A1 | 1/2021 | Giebat et al. |
| 2021/0023248 A1 | 1/2021 | Townsend et al. |
| 2021/0056791 A1 | 2/2021 | Shen |
| 2021/0123287 A1 | 4/2021 | Miller et al. |
| 2021/0134096 A1 | 5/2021 | Pukari |
| 2021/0192876 A1* | 6/2021 | Tikkanen ........... G07C 9/00817 |
| 2021/0217260 A1 | 7/2021 | Chen |
| 2021/0252179 A1 | 8/2021 | Grinstead et al. |
| 2021/0308311 A1 | 10/2021 | Stewart et al. |
| 2022/0148393 A1 | 5/2022 | Shen et al. |
| 2022/0307316 A1 | 9/2022 | Soderqvist |
| 2023/0104006 A1 | 4/2023 | Tien |

FOREIGN PATENT DOCUMENTS

| | | |
|---|---|---|
| EP | 1788169 A1 | 5/2007 |
| EP | 3550528 A1 | 9/2019 |
| EP | 3805490 A1 | 4/2021 |
| GB | 2572027 A | 9/2019 |
| KR | 20210019168 A | 2/2021 |
| KR | 20210033154 A | 3/2021 |
| WO | 8800633 A1 | 1/1988 |
| WO | 2021007588 A1 | 1/2021 |
| WO | 2021050616 A1 | 3/2021 |
| WO | 2021214134 A1 | 10/2021 |

* cited by examiner

METHOD FOR UNLOCKING A LOCK USING REAL-TIME WIRELESS POWER SUPPLY

CROSS REFERENCE TO RELATED APPLICATION

This is a divisional application of U.S. patent application Ser. No. 17/350,108 filed Jun. 17, 2021, now U.S. Pat. No. 11,756,355, the entire contents of which are incorporated herein by reference.

BACKGROUND OF THE INVENTION

The present invention relates to a method for unlocking a lock using real-time wireless power supply and, more particularly, to a powerless lock that can be wirelessly supplied with power required for operation through an electronic key comprised of a smart mobile device or the like.

With the development of technology, conventional mechanical locks have been evolved into electronic locks of electromechanical integration type. Operation of a portion of the electronic locks replies on power and generally requires a detachable battery for suppling power for an unlocking authentication identification procedure, a procedure of inputting unlocking authentication information, and operation of a motor or an electromagnetic valve. The electronic locks of this type encounters problems in use. For example, the electronic locks cannot operate when the detachable battery runs out of power. Furthermore, the electronic locks with power could still be decrypted, even though the possibility is not high.

BRIEF SUMMARY OF THE INVENTION

To solve the above problems, in an aspect, the present invention provides a method for unlocking a lock using real-time wireless power supply, comprising:
  remaining an offline state between an electronic key and a lock when the electronic key is not used to execute an authentication identification procedure;
  executing the authentication identification procedure using the electronic key, wherein the electronic key and the lock remain in the offline state when authentication identification is identified as being unsuccessful by the electronic key;
  identifying whether a distance between the electronic key and the lock are in a communication range when the authentication identification is identified as being successful by the electronic key, wherein the electronic key and the lock remain in the offline state when the distance between the electronic key and the lock exceeds the communication range;
  wirelessly supplying power from the electronic key to the lock when the distance between the electronic key and the lock is in the communication range and when the authentication identification is identified as being successful by the electronic key, permitting the lock to use the wirelessly supplied power to operate;
  outputting an unlocking command from the electronic key to the lock during or after wireless power supply from the electronic key to the lock;
  unlocking the lock with the power wirelessly suppled from the electronic key when the lock receives the unlocking command from the electronic key;
  identifying whether a pre-set period of time has expired after the lock is unlocked or after the electronic key outputs the unlocking command, wherein the electronic key keeps wirelessly supplying power to the lock when the pre-set period of time has not expired;
  locking the lock using the power wirelessly supplied from the electronic key to the lock when the pre-set period of time has expired; and
  cutting off wireless power supply from the electronic key to the lock after the lock is locked.

Thus, the lock used in the method for unlocking a lock using real-time wireless power supply of each of the first and second embodiments according to the present invention is not provided with a power source, such that operation of the lock requires wireless power supply which is carried out after pairing. Thus, it is difficult to decrypt the lock. Furthermore, a repeatedly rechargeable electronic key can be used to wirelessly supply power, such that it is not necessary to worry about power shortage of the lock.

In an example, the method further comprises detecting whether the lock is operated by an external force after the lock is unlocked. The electronic key keeps wirelessly supplying power to the lock when it is detected that no external force is applied to the lock. When it is detected that the external force is applied to operate the lock, the lock uses the power wirelessly suppled from the electronic key to proceed with locking of the lock, and the wirelessly power supply is then cut off.

In an example, the method further comprises using the lock to increase a voltage of the power wirelessly supplied from the electronic key to enable operation of the lock.

In an example, the pre-set period of time is in a range of 5-30 seconds.

In an example, the unlocking command is outputted after the lock is enabled to operate after the wireless power supply from the electronic key.

In an example, countdown of the pre-set period of time begins from a moment the lock is unlocked.

In another example, countdown of the pre-set period of time begins from a moment the electronic key outputs the unlocking command.

In an example, the authentication identification includes inputting a real-time authentication identification information into the electronic key. The authentication identification is identified as being successful when the real-time authentication identification information is identified as being correct. The authentication identification is identified as being unsuccessful when the real-time authentication identification information is identified as being incorrect.

In an example, inputting the real-time authentication identification information includes inputting a fingerprint or a face image of a holder of the electronic key.

In an example, the electronic key is comprised of a repeatedly rechargeable smart mobile device.

In a second aspect, a method for unlocking a lock using real-time wireless power supply comprises:
  remaining an offline state between an electronic key and a lock when the electronic key is not used to execute an authentication identification procedure;
  identifying whether a distance between the electronic key and the lock are in a communication range while undergoing the authentication identification procedure, wherein the electronic key and the lock remain in the offline state when the distance between the electronic key and the lock exceeds the communication range;
  wirelessly supplying power from the electronic key to the lock when the distance between the electronic key and the lock is in the communication range while undergoing the authentication identification, wherein the electronic key does not output an unlocking command when the authentication identification procedure is identified as being unsuccessful by the electronic key;

outputting an unlocking command from the electronic key to the lock when the authentication identification by the electronic key is identified as being successful;

unlocking the lock with the power wirelessly suppled from the electronic key when the lock receives the unlocking command from the electronic key;

identifying whether a pre-set period of time has expired after the lock is unlocked or after the electronic key outputs the unlocking command, wherein the electronic key keeps wirelessly supplying power to the lock when the pre-set period of time has not expired;

locking the lock using the power wirelessly supplied from the electronic key to the lock when the pre-set period of time has expired; and cutting off wireless power supply from the electronic key to the lock after the lock is locked.

Thus, wireless power supply to the lock is carried out when the holder of the electronic key proceeds with the authentication identification. Thus, the lock has sufficient time to respond to the wireless power supply to permit subsequent execution of the unlocking command after successful authentication identification.

In an example, the method further comprises detecting whether the lock is operated by an external force after the lock is unlocked. The electronic key keeps wirelessly supplying power to the lock when it is detected that no external force is applied to the lock. When it is detected that the external force is applied to operate the lock, the lock uses the power wirelessly suppled from the electronic key to proceed with locking of the lock, and the wirelessly power supply is then cut off.

In an example, the method further comprises using the lock to increase a voltage of the power wirelessly supplied from the electronic key to enable operation of the lock.

In an example, the pre-set period of time is in a range of 5-30 seconds.

In an example, countdown of the pre-set period of time begins from the moment the lock is unlocked.

In another example, countdown of the pre-set period of time begins from the moment the electronic key outputs the unlocking command.

In an example, the authentication identification includes inputting a real-time authentication identification information into the electronic key. The authentication identification is identified as being successful when the real-time authentication identification information is identified as being correct. The authentication identification is identified as being unsuccessful when the real-time authentication identification information is identified as being incorrect.

In an example, inputting the real-time authentication identification information includes inputting a fingerprint or a face image of a holder of the electronic key.

In an example, the electronic key is comprised of a repeatedly rechargeable smart mobile device.

The present invention will become clearer in light of the following detailed description of illustrative embodiments of this invention described in connection with the drawings.

DETAILED DESCRIPTION OF THE INVENTION

Figure 1:
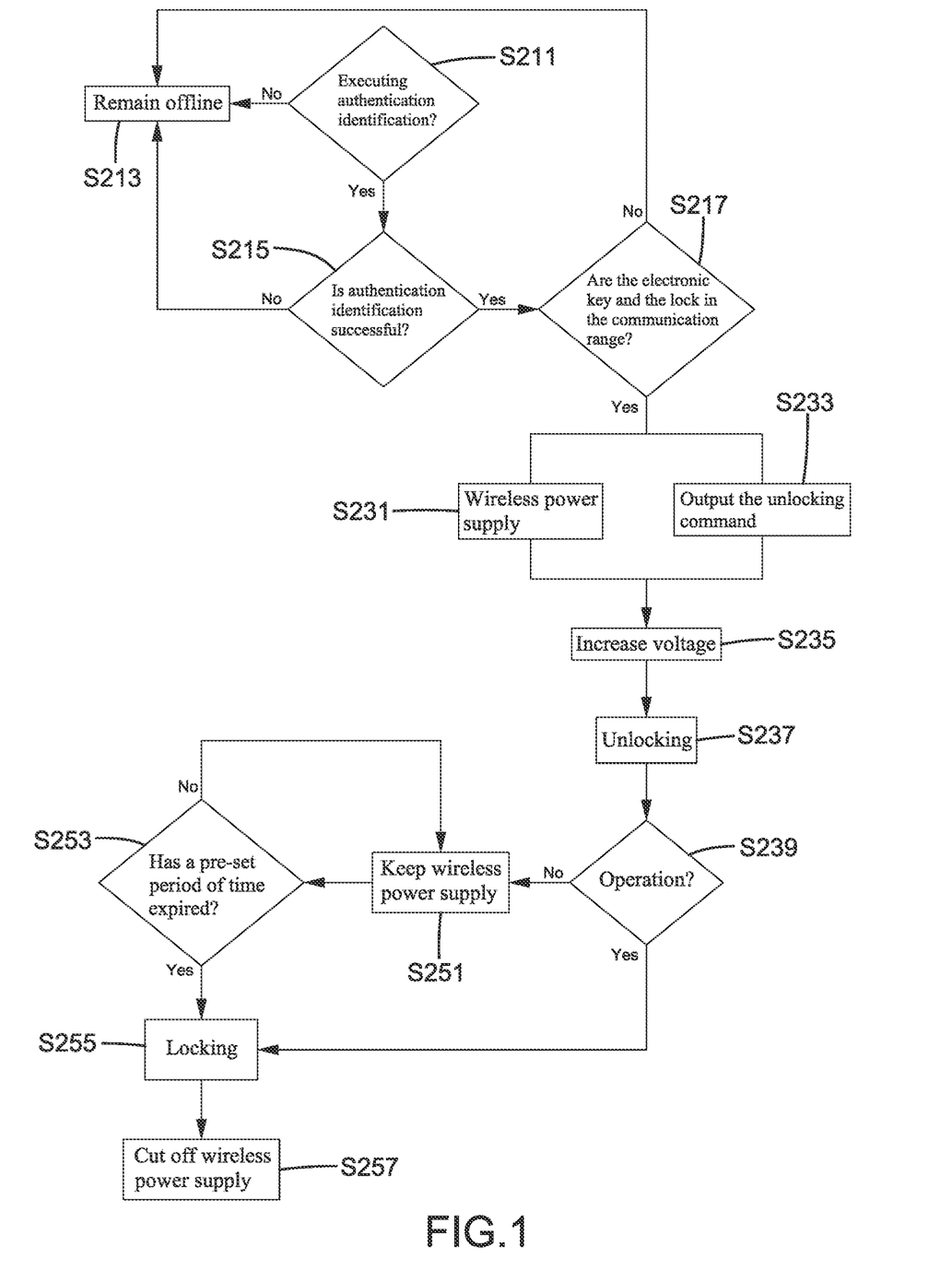
FIG. 1 is a flowchart illustrating a method for unlocking a lock using real-time wireless power supply of a first embodiment according to the present invention.

The present invention relates to a method for unlocking a lock using real-time wireless power supply. FIG. 1 shows a method for unlocking a lock using real-time wireless power supply of a first embodiment according to the present invention. The method of the first embodiment includes identifying whether to execute an authentication identification procedure or not (S211). When an electronic key is not used to execute the authentication identification procedure, the electronic key and a paired lock (hereinafter referred to as "the lock") are in an offline state (S213). Specifically, the electronic key is paired with a lock of electronic type in advance. The electronic key can be, but not limited to, a smart mobile device (such as a smart phone, a smart watch, etc.) which can be repeatedly recharged and on which a control APP is installed. Alternatively, the electronic key can be a repeatedly rechargeable, portable electronic key developed by a manufacture of the lock. Pairing of the electronic key and the lock can be achieved by logging the lock in a system of the electronic key. Pairing of the electronic key and the lock can be accomplished by many well-known techniques and is not the issue to be solved by the present invention, such that detailed description of the matching is not set forth herein to avoid redundancy.

In step S215, it is identified whether the authentication identification is successful. When the authentication identification fails, the electronic key and the lock remain in the offline state (step S213). The authentication identification procedure can be, but not limited to, cooperation of the control APP installed in the smart mobile device with a lens or a fingerprint pick-up device of the smart mobile device. For example, the control APP installed on the smart mobile phone is executed and requests a holder of the smart mobile device to input a real-time face image (a real-time authentication identification information) through the lens of the smart mobile device. The smart mobile device identifies whether the real-time face image is correct. For example, the real-time face image is compared with an authenticated face image that has been authenticated by the smart mobile device. When the real-time face image does not match with the authenticated face image, the electronic key and the lock remain offline. Namely, there is no connection (including wireless charging) between the electronic key and the lock.

When the authentication identification executed by the electronic key is successful, it is identified whether the electronic key and the lock are in a communication range (S217). When the distance between the electronic key and the lock exceeds the communication range, the electronic key and the lock remain offline (S213). Namely, no matter the authentication identification of the electronic key is successful or not, the electronic key and the lock remain offline as long as the distance between the electronic key and the lock is not in the communication range. Note that the communication range is not intended to restrict the maximum communication range. For example, the communication range is not limited to the wireless power supply range. Assume the maximum distance permitting wireless power supply is 3 meters, the communication range can be set as 2 meters. Given this setting, when the distance between the electronic key and the lock is in a range between 2-3 meters, the distance between the electronic key and the lock will still be considered as exceeding the communication range.

Alternatively, the communication range can be the same as the maximum operation range of wireless power supply. In this case, the distance between the electronic key and the lock must be within the wireless power supply range, because the lock is a powerless lock, which is a lock without a built-in battery or a lock supplied with power by wired connection. In a case that the distance between the electronic key and the lock exceeds the wireless power supply range, the electronic key cannot wirelessly supply power to the lock, such that the lock cannot operate. In a case that the maximum operation range for wireless power supply can be set as the communication range, the communication range (such as within the powerless power supply range) can be different due to different techniques adopted. For example, the wireless charging range of a wireless charging technique of electromagnetic induction type meeting the requirements of wireless charging is smaller (such as the distance between the receiver and the transmitter is less than 30 mm), whereas the wireless power supply range of other techniques (such as the WattUp proposed by Energous Corporation and Cota proposed by Ossia Corporation) can be larger (generally larger than 1 meter). It can be appreciated that the wireless power supply techniques used in the present invention are not limited in this regard.

When the distance between the electronic key and the lock is in the communication range and the authentication identification is successful, the electronic key undergoes wireless power supply to the lock, such that the lock can use the power supplied wirelessly (S231). Specifically, since the lock is powerless, the authentication identification is carried out by the electronic key. For example, in a case that an authenticated face image is compared with a real-time face image inputted through the electronic key, the electronic key wirelessly supplies power to the lock when the real-time face image matches with the authenticated face image and when the distance between the electronic key and the lock is within the wireless power supply range.

In step S235, when the electronic key wirelessly supplies power to the lock, the lock increases the voltage of the power supplied wirelessly, which is required for operation of the lock. Specifically, the lock can include a circuit board for control purposes and a motor for locking and unlocking the lock. The voltage and electric current required for operating the motor may not directly come from the wireless power supply. For example, given the power of the wireless power supply is smaller than 5 w, the voltage and electric current may not be sufficient to drive the motor. Nevertheless, when the power of the wireless power supply is higher (such as 10-15 w), the voltage and electric current are sufficient to directly drive the motor. Note that since the lock per se is powerless, the voltage increasing procedure is carried out after the lock receives the power supplied wirelessly. Specifically, the lock includes a corresponding circuit that operates to increase the voltage of the power supplied wirelessly and that adjusts the electric current to a magnitude suitable for operation of the motor.

In step S233, during or after wireless power supply from the electronic key to the lock, the electronic key outputs an unlocking command to the lock. For example, after the lock receives power from the electronic key through wireless power supply, the lock can receive and handle the unlocking command from the electronic key. Note that the wireless power supply (step S231) and outputting the unlocking command (step S233) can proceed simultaneously. For example, while the electronic key undergoes the wireless power supply, the unlocking command is outputted and lasts for a short period of time (such as 2 seconds) to wait for response of the lock to acquire the power required for operation of the lock. Nevertheless, the procedures can be carried out at different times. For example, an unlocking command is transmitted to the lock after a period of time (such as 0.5 seconds), starting from beginning of the wireless power supply to the lock from the electronic key, has lapsed.

The lock receiving the unlocking command from the electronic key proceeds with an unlocking operation using the power wirelessly supplied from the electronic key (S237). Specifically, when the lock receives the unlocking command from the electronic key, the motor of the lock uses the power wirelessly supplied from the electronic key to drive the mechanism inside the lock, thereby achieving the unlocking operation.

After unlocking the lock, it is detected whether the lock is operated by an external force (S239). When no external force is applied to operate the lock, the electronic lock remains the wireless power supply (S251). On the other hand, when it is detected that the lock is operated by an external force, the lock uses the power wirelessly supplied from the electronic key (S255) to proceed with a locking operation, and the wireless power supply is then cut off (step S257).

In an example, the lock is a door lock installed on a door and is paired with the electronic key. When it is intended to unlock the door lock, it is detected whether the door is opened or a handle for opening the door is rotated. In an embodiment, a first micro switch is mounted in the door lock. When the first micro switch in the door lock is not activated, it is identified that no external force is applied to operate the door lock. In this case, the electronic key continues the wireless power supply (S251), such that the door lock remains in an operable state or an unlocked state and has power to detect whether the handle of the door lock is operated. When the handle of the door lock is operated and the first micro switch is activated, the door lock uses the wirelessly supplied power to drive the motor to thereby return the door lock to the locked state. After door lock is locked, a second micro switch can be used for detection. The second micro switch is activated when the door lock is locked. In this case, the door lock transmits a signal (demanding cutting off of the wireless power supply) to the electronic key, such that the electronic key cuts off the wireless power supply (S257).

A pre-set period of time is set and is counted down from the moment the lock is unlocked or the electronic key outputs the unlocking command. In step S253, it is identified whether the pre-set period of time has expired. The electronic key continues the wireless power supply procedure when the pre-set period of time has not expired (S251).

Namely, in a case that a holder of the electronic key does not operate the lock at all or does not operate the lock immediately, actual use of the lock will be inconvenient if the wireless power supply procedure is not maintained for a period of time. For example, if the wireless power supply is cut off before the lock is operated, the motor of the lock cannot be driven to achieve the locking operation due to lack of electricity.

When the lock is not operated, continuous wireless supply to the lock by the electronic key is a waste of the power of the electronic key whereas the lock remains in the unlocked state, which jeopardizes the safety. Thus, after the lock is unlocked, the wireless power supply must be maintained for a specific period of time to assure that the lock has sufficient power to set back to the locked state. In an example, the pre-set period of time is set to a value in a range of 5-30 seconds. For example, when the pre-set period of time is 10 seconds, a countdown of 10 seconds begins immediately after the lock is unlocked. Thus, the electronic key still wirelessly supplies power to the lock for 10 seconds.

Note that the starting time of the countdown of the pre-set period of time can be varied. For example, the countdown begins when the unlocking command is outputted by the electronic key, or when unlocking of the lock is completed.

In step S255, when the pre-set period of time has expired, the lock uses the power wirelessly supplied from the electronic key to proceed with the locking operation. Namely, when the lock is operated or the countdown of the pre-set period of time finishes, the lock will return to the unlocked state. This assures the lock is normally in the locked state to avoid the holder of the electronic key from being unaware of wireless power supply to the lock (which keeps the lock in the unlocked state).

After the lock is locked, the communication between the electronic key and the lock is cut off, and the wireless power supply is stopped (S257). Namely, no matter the lock is locked by an external force or completion of the countdown of the pre-set period of time, the lock will use the wireless supplied power to send a signal (for terminating the wireless power supply) to the electronic key, such that the electronic key cuts off the wireless power supply (S257). Thus, the electronic key cuts off the wireless power supply to the lock, such that the lock becomes a powerless state and is, thus, difficult to decrypt.

Figure 2:
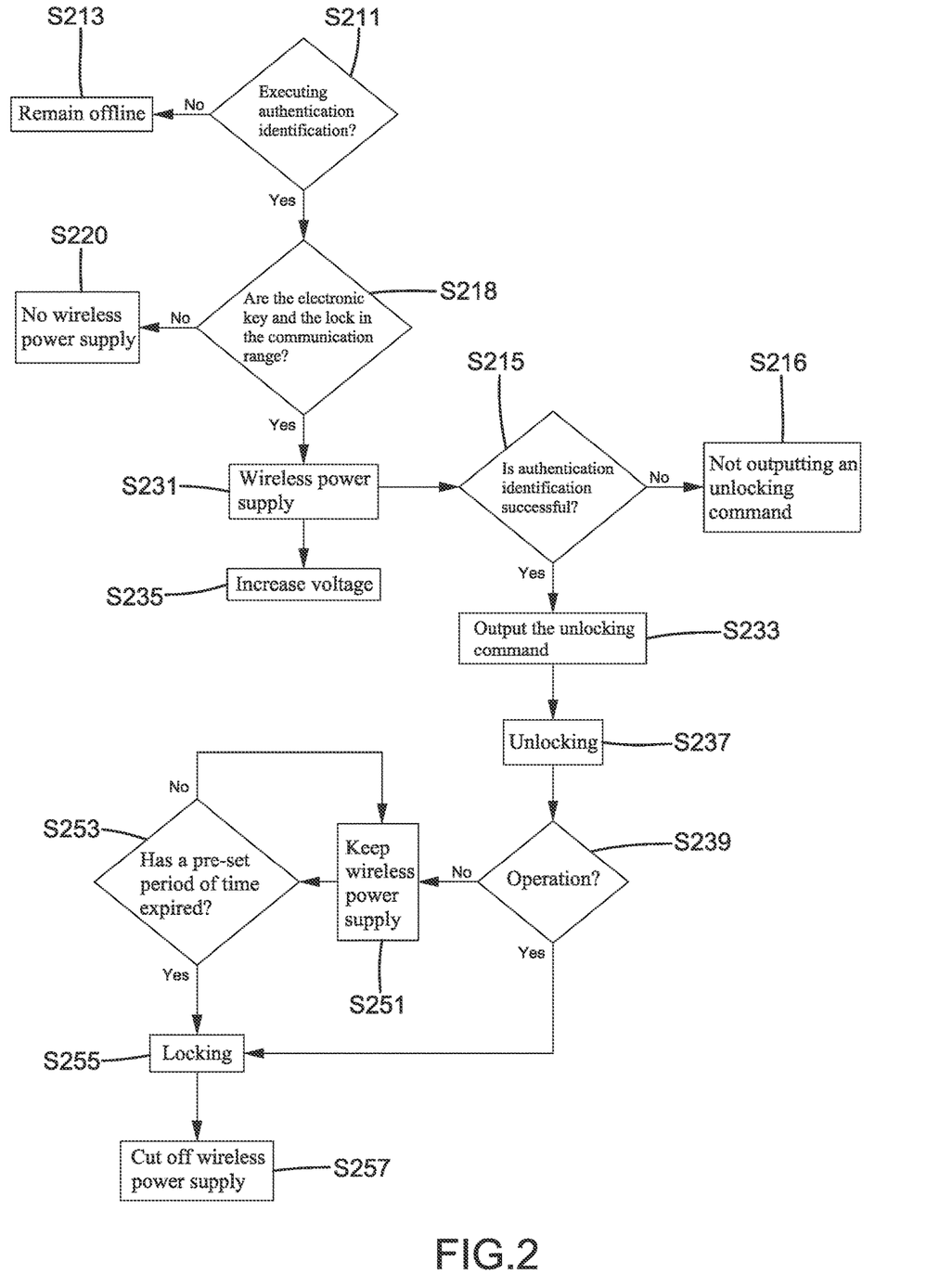
FIG. 2 is a flowchart illustrating a method for unlocking a lock using real-time wireless power supply of a second embodiment according to the present invention.

In addition to the first embodiment shown in FIG. 1, other variants of the method according to the present invention are still possible. FIG. 2 shows a method for unlocking a lock using real-time wireless power supply of a second embodiment of the present invention. Specifically, this method includes identifying whether to execute an authentication identification procedure or not (S211). When an electronic key is not used to execute the authentication identification procedure, the electronic key and a paired lock remain offline (S213). Specifically, the electronic key is paired with a lock of electronic type in advance. The electronic key can be, but not limited to, a smart mobile device which can be repeatedly recharged and on which a control APP is installed. Alternatively, the electronic key can be a repeatedly rechargeable, portable electronic key developed by a manufacture of the lock. Pairing of the electronic key and the lock can be achieved by logging the lock in a system of the electronic key. Pairing of the electronic key and the lock can be accomplished by many well-known techniques and is not the issue to be solved by the present invention, such that detailed description of the matching is not set forth herein to avoid redundancy.

When the authentication identification executed by the electronic key is successful, it is identified whether the electronic key and the lock are in the communication range (S218). When the distance between the electronic key and the lock exceeds the communication range, the electronic key does not wirelessly supply power to the lock (S220). Namely, no matter the authentication identification of the electronic key is successful or not, the electronic key and the lock remain offline as long as the distance between the electronic key and the lock exceeds the communication range. Note that the communication range is not intended to restrict the maximum communication range. For example, the communication range is not limited to the wireless power supply range. Assume the maximum distance permitting wireless power supply is 3 meters, the communication range can be set as 2 meters. Given this setting, when the distance between the electronic key and the lock is in a range between 2-3 meters, the distance between the electronic key and the lock will still be considered as exceeding the communication range.

Alternatively, the communication range can be the same as the maximum operation range of wireless power supply. In this case, the distance between the electronic key and the lock must be within the wireless power supply range, because the lock is a powerless lock, which is a lock without a built-in battery or a lock supplied with power by wired connection. In a case that the distance between the electronic key and the lock exceeds the wireless power supply range, the electronic key cannot wirelessly supply power to the lock, such that the lock cannot operate. In a case that the maximum operation range for wireless power supply can be set as the communication range, the communication range (such as within the powerless power supply range) can be different due to different techniques adopted. For example, the wireless charging range of a wireless charging technique of electromagnetic induction type meeting the requirements of wireless charging is smaller (such as the distance between the receiver and the transmitter is less than 30 mm), whereas the wireless power supply range of other techniques (such as the WattUp proposed by Energous Corporation and Cota proposed by Ossia Corporation) can be larger (generally lager than 1 meter). It can be appreciated that the wireless power supply techniques used in the present invention are not limited in this regard.

Paring of the electronic key and the lock includes, but not limited to, conventional pairing techniques, such as Bluetooth pairing technique, Wi-Fi pairing technique, etc. For example, information of the lock is logged into the electronic key, such that the lock is paired with the electronic key. In another example, the lock is provided with a hardware identification number which is registered into the electronic key to achieve successful pairing.

When the distance between the electronic key and the lock is in the communication range and the authentication identification is successful, the electronic key undergoes wireless power supply to the lock, such that the lock can use the power supplied wirelessly (S231). Specifically, to avoid unnecessary consumption of electricity of the electronic key, the electronic key wirelessly supplies power to the lock only when the holder holding the electronic key intends to proceed with the authentication identification. Note that in this procedure, regardless of the result of the authentication identification, the electronic key proceeds with wireless wire supply to the lock even though the inputting of the authentication identification information is still undergoing (which is different from the first embodiment). This is advantageous in providing the lock with sufficient response time to use the power supplied wirelessly. Thus, the lock enters a state receiving the wireless power supply, which is helpful in reliably receiving other signals or commands from the electronic key.

In step S235, when the electronic key wirelessly supplies power to the lock, the lock increases the voltage of the power supplied wirelessly, which is required for operation of the lock. The response time of the lock in the wireless power supply procedure (S231) can be the time required for the voltage-increasing step (S235). Specifically, the lock can include a circuit board for control purposes and a motor for locking and unlocking the lock. The voltage and electric current required for operating the motor may not directly come from the wireless power supply. For example, given the power of the wireless power supply is smaller than 5 w, the voltage and electric current may not be sufficient to drive the motor. Nevertheless, when the power of the wireless power supply is higher (such as 10-15 w), the voltage and electric current are sufficient to directly drive the motor. Note that since the lock per se is powerless, the voltage increasing procedure is carried out after the lock receives the power supplied wirelessly. Specifically, the lock includes a corresponding circuit that operates to increase the voltage of the power supplied wirelessly and that adjusts the electric current to a magnitude suitable for operation of the motor.

In step S215, it is identified whether the authentication identification is successful. When the authentication identification fails, the electronic key does not output the unlocking command to the lock (step S216). The authentication identification procedure can be, but not limited to, cooperation of the control APP installed in the smart mobile device with a lens or a fingerprint pick-up device of the smart mobile device. For example, the control APP installed on the smart mobile phone is executed and requests a holder of the smart mobile device to input a real-time face image through the lens of the smart mobile device. The smart mobile device identifies whether the real-time face image is correct. For example, the real-time face image is compared with an authenticated face image that has been authenticated by the smart mobile device. When the real-time face image does not match with the authenticated face image, the electronic key does not output the unlocking command to the lock (step S216).

In step S233, when the authentication identification by the electronic key is successful, the electronic key outputs the unlocking command to the lock. Specifically, after the lock receives power wirelessly supplied from the electronic key, the power can receive and handle the unlocking command from the electronic key.

The lock receiving the unlocking command from the electronic key proceeds with an unlocking operation by using the power wirelessly supplied from the electronic key (S237). Specifically, when the lock receives the unlocking command from the electronic key, the motor of the lock uses the power wirelessly supplied from the electronic key to drive the mechanism inside the lock, thereby achieving the unlocking operation.

The steps of opening operation (S239), keeping wireless power supply (S251), identification of expiration of the pre-set period of time (S253), locking operation (S255), and cutting off wireless power supply (S257) in the method of the second embodiment illustrated by the flowchart of FIG. 2 are the same as those of the first embodiment described with reference to FIG. 1. Thus, detailed descriptions are not set forth to avoid redundancy.

The lock used in the method for unlocking a lock using real-time wireless power supply of each of the first and second embodiments according to the present invention is not provided with a power source, such that operation of the lock requires wireless power supply which is carried out after pairing. Thus, it is difficult to decrypt the lock.

The lock used in the method for unlocking a lock using real-time wireless power supply of each of the first and second embodiments according to the present invention is not provided with a power source, a repeatedly rechargeable electronic key can be used to wirelessly supply power. Thus, it is not necessary to worry about power shortage of the lock.

In the method for unlocking a lock using real-time wireless power supply of the second embodiment according to the present invention, wireless power supply to the lock is carried out when the holder of the electronic key proceeds with the authentication identification. Thus, the lock has sufficient time to respond to the wireless power supply to permit subsequent execution of the unlocking command after successful authentication identification.

Now that the basic teachings of the present invention have been explained, many extensions and variations will be obvious to one having ordinary skill in the art. For example, the method of each of the first and second embodiments does not have to include the voltage increasing step S235. For example, when the wireless power supply from the electronic key to the lock has a higher power (such as 10-15 w) sufficient to drive the motor, it is not necessary to increase the voltage of the power wirelessly supplied to the lock.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A method for unlocking a lock using real-time wireless power supply, comprising:
   remaining an offline state between an electronic key and a lock when the electronic key is not used to execute an authentication identification procedure;
   executing the authentication identification procedure using the electronic key, wherein the electronic key and the lock remain in the offline state when authentication identification is identified as being unsuccessful by the electronic key;
   identifying whether a distance between the electronic key and the lock are in a communication range when the authentication identification is identified as being successful by the electronic key, wherein the electronic key and the lock remain in the offline state when the distance between the electronic key and the lock exceeds the communication range;
   wirelessly supplying power from the electronic key to the lock when the distance between the electronic key and the lock is in the communication range and when the authentication identification is identified as being successful by the electronic key, permitting the lock to use the wirelessly supplied power to operate;
   outputting an unlocking command from the electronic key to the lock during or after wireless power supply from the electronic key to the lock;
   unlocking the lock with the power wirelessly suppled from the electronic key when the lock receives the unlocking command from the electronic key;
   identifying whether a pre-set period of time has expired after the lock is unlocked or after the electronic key outputs the unlocking command, wherein the electronic key keeps wirelessly supplying power to the lock when the pre-set period of time has not expired;
   locking the lock using the power wirelessly supplied from the electronic key to the lock when the pre-set period of time has expired; and
   cutting off wireless power supply from the electronic key to the lock after the lock is locked.

2. The method for unlocking the lock using real-time wireless power supply as claimed in claim 1, further comprising detecting whether the lock is operated by an external force after the lock is unlocked, wherein the electronic key keeps wirelessly supplying power to the lock when it is detected that no external force is applied to the lock, and wherein when it is detected that the external force is applied to operate the lock, the lock uses the power wirelessly suppled from the electronic key to proceed with locking of the lock, and the wirelessly power supply is then cut off.

3. The method for unlocking the lock using real-time wireless power supply as claimed in claim 1, further comprising using the lock to increase a voltage of the power wirelessly supplied from the electronic key to enable operation of the lock.

4. The method for unlocking the lock using real-time wireless power supply as claimed in claim 1, wherein the pre-set period of time is in a range of 5-30 seconds.

5. The method for unlocking the lock using real-time wireless power supply as claimed in claim 1, wherein the unlocking command is outputted after the lock is enabled to operate after the wireless power supply from the electronic key.

6. The method for unlocking the lock using real-time wireless power supply as claimed in claim 1, wherein countdown of the pre-set period of time begins from a moment the lock is unlocked.

7. The method for unlocking the lock using real-time wireless power supply as claimed in claim 1, wherein countdown of the pre-set period of time begins from a moment the electronic key outputs the unlocking command.

8. The method for unlocking the lock using real-time wireless power supply as claimed in claim 1, wherein the authentication identification includes inputting a real-time authentication identification information into the electronic key, wherein the authentication identification is identified as being successful when the real-time authentication identification information is identified as being correct, and wherein the authentication identification is identified as being unsuccessful when the real-time authentication identification information is identified as being incorrect.

9. The method for unlocking the lock using real-time wireless power supply as claimed in claim 8, wherein inputting the real-time authentication identification information includes inputting a fingerprint or a face image of a holder of the electronic key.

10. The method for unlocking the lock using real-time wireless power supply as claimed in claim 1, wherein the electronic key is comprised of a repeatedly rechargeable smart mobile device.

\* \* \* \* \*